(12) United States Patent
Amidaiji et al.

(10) Patent No.: US 8,354,168 B2
(45) Date of Patent: Jan. 15, 2013

(54) EPOXY ANTICORROSIVE COATING COMPOSITION, ANTICORROSIVE COATING FILM, ANTIFOULING ORGANOPOLYSILOXANE COMPOSITE COATING FILM, AND SHIP AND UNDERWATER STRUCTURE COVERED BY SUCH COMPOSITE COATING FILM

(75) Inventors: Katsuyoshi Amidaiji, Ohtake (JP); Toshiharu Yamamoto, Ohtake (JP)

(73) Assignee: Chugoku Marine Paints, Ltd., Ohtake-shi (JP)

( * ) Notice: Subject to any disclaimer, the term of this patent is extended or adjusted under 35 U.S.C. 154(b) by 1032 days.

(21) Appl. No.: 11/721,756

(22) PCT Filed: Dec. 8, 2005

(86) PCT No.: PCT/JP2005/022561
§ 371 (c)(1),
(2), (4) Date: Jun. 14, 2007

(87) PCT Pub. No.: WO2006/064712
PCT Pub. Date: Jun. 22, 2006

(65) Prior Publication Data
US 2009/0123758 A1 May 14, 2009

(30) Foreign Application Priority Data
Dec. 14, 2004 (JP) ................................. 2004-361748

(51) Int. Cl.
*B32B 27/38* (2006.01)
*B32B 27/28* (2006.01)
*B32B 15/092* (2006.01)

(52) U.S. Cl. ......... 428/414; 428/416; 428/447; 428/450

(58) Field of Classification Search .................. 428/414, 428/416, 418, 447, 450
See application file for complete search history.

(56) References Cited

U.S. PATENT DOCUMENTS

| | | | |
|---|---|---|---|
| 5,192,603 A | 3/1993 | Slater et al. | |
| 5,691,019 A * | 11/1997 | Carroll et al. | ................ 428/40.1 |
| 6,723,376 B1 | 4/2004 | Hamilton et al. | |

FOREIGN PATENT DOCUMENTS

| | | |
|---|---|---|
| EP | 0 247 019 A2 | 11/1987 |
| EP | 0 532 273 A1 | 3/1993 |
| GB | 2 163 754 A | 3/1986 |
| JP | 53-137233 | 11/1978 |
| JP | 54-142241 | 11/1979 |
| JP | 1046338 | 5/1981 |
| JP | 1276889 | 8/1985 |
| JP | 2 238941 | 9/1990 |
| JP | 09 263713 | 10/1997 |
| JP | 09263713 A * | 10/1997 |
| JP | 10 211464 | 8/1998 |
| JP | 10-219185 | 8/1998 |
| JP | 10-296175 | 11/1998 |
| JP | 2000 1645 | 1/2000 |
| JP | 2001 181509 | 7/2001 |
| JP | 2001181509 A * | 7/2001 |
| JP | 2001-279167 | 10/2001 |
| JP | 2001 32914 | 11/2001 |
| JP | 2001-327914 | 11/2001 |
| WO | WO 99/33927 | 7/1999 |
| WO | WO 99/67336 A1 | 12/1999 |

OTHER PUBLICATIONS

Machine translation of Amidaichi et al. (JP 2001-279167).*
Machine translation of JP 09263713 A (1997).*
Machine translation of JP 2001181509 A (2001).*

* cited by examiner

Primary Examiner — Callie Shosho
Assistant Examiner — John Freeman
(74) *Attorney, Agent, or Firm* — Oblon, Spivak, McClelland, Maier & Neustadt, L.L.P.

(57) ABSTRACT

Disclosed is an epoxy anticorrosive coating composition used for forming an epoxy anticorrosive coating film in an antifouling composite coating film comprising an epoxy anticorrosive coating film and an organopolysiloxane antifouling coating film which are laminated in order on a surface of a base, said epoxy anticorrosive coating composition comprising (A) an epoxy resin, (B) a curing agent for epoxy resins, and (C) a modifier which is either (i) a modifier comprising a hydroxyl group-containing petroleum resin (c1) or a hydroxyl group-containing terpenephenol resin (c2), or (ii) a modifier comprising a hydroxyl group-containing petroleum resin (c1) or a hydroxyl group-containing terpenephenol resin (c2) and a coumarone resin (c3).

12 Claims, No Drawings

EPOXY ANTICORROSIVE COATING COMPOSITION, ANTICORROSIVE COATING FILM, ANTIFOULING ORGANOPOLYSILOXANE COMPOSITE COATING FILM, AND SHIP AND UNDERWATER STRUCTURE COVERED BY SUCH COMPOSITE COATING FILM

TECHNICAL FIELD

The present invention relates to an epoxy anticorrosive coating composition capable of forming an anticorrosive coating film having excellent adhesion to an organopolysiloxane antifouling coating film and having excellent anticorrosion property, an anticorrosive coating film formed from the composition an organopolysiloxane antifouling composite coating film, and a ship or an underwater structure coated with the composite coating film.

BACKGROUND ART

If marine organisms adhere and grow on the water-contact regions of industrial aquatic equipment, water-intake equipment of atomic power plants or the like, marine structures, ships, etc., various damages are brought about. Particularly in cooling water-intake channels of power plants, growth of marine organisms increases flow resistance of running seawater for cooling, and as a result the function of a heat exchanger is lowered and evil influence is exerted on power generation efficiency. Then, an antifouling coating film is formed on a surface of a base to prevent adhesion of marine organisms. As such an antifouling coating film, an antifouling composite coating film constituted of an epoxy undercoating film and a silicone finish coating film has been employed. This composite coating film, however, has poor adhesion between the finish coating film and the undercoating film and has a problem of durability of the water-contact region. Therefore, an intermediate coating film (binder layer) is provided between the undercoating film and the finish coating film to improve adhesion (e.g., patent documents 1 and 2).

In this method, however, it takes a long time to form the antifouling coating film because the intermediate coating film is formed. Moreover, there still resides a problem of anticorrosion property though the adhesion between the undercoating film and the finish coating film has been improved.

As a means to solve such a problem, there has been disclosed a composite antifouling coating film in which an undercoating film of a vinyl ester resin or an unsaturated polyester resin and a silicone resin antifouling coating film are formed in order on a surface of a base (e.g., patent document 3) or a composite coating film in which an undercoating film composed of an undercoating composition containing a block polymer constituted of organosiloxane units and alkylene oxide units and having polar groups at both ends of a molecule and a finish coating film composed of a silicone rubber finish coating composition are formed in order on a surface of a base (e.g., patent document 4).

According to such a composite coating film, the production process can be shortened because an intermediate coating film is not formed, and the adhesion between the undercoating film and the finish coating film can be improved. However, there is yet room for improvement in the anticorrosion property.

On the other hand, an anticorrosive coating composition comprising (a) an epoxy resin, (b) a curing agent, (c) a coumarone resin and (d) a hydroxyl group-containing terpenephenol resin and a coating film formed from the composition have been disclosed in a patent document 5. In this document 5, however, there is neither description nor suggestion of adhesion of this coating film to other coating films, particularly to an organopolysiloxane antifouling coating film.

Patent document 1: Japanese Patent No. 1046338
Patent document 2: Japanese Patent No. 1276889
Patent document 3: Japanese Patent Laid-Open Publication No. 296175/1998
Patent document 4: Japanese Patent Laid-Open Publication No. 327914/2001
Patent document 5: Japanese Patent Laid-Open Publication No. 279167/2001

DISCLOSURE OF THE INVENTION

Problem to be Solved by the Invention

It is an object of the present invention to provide an epoxy anticorrosive coating composition capable of forming an anticorrosive coating film having excellent adhesion to an organopolysiloxane antifouling coating film and having excellent anticorrosion property, an anticorrosive coating film formed from the composition, an organopolysiloxane antifouling composite coating film, and a ship or an underwater structure coated with the coating film.

Means to Solve the Problem

The epoxy anticorrosive coating composition of the present invention is an anticorrosive coating composition used for forming an epoxy anticorrosive coating film in an antifouling composite coating film comprising an epoxy anticorrosive coating film and an organopolysiloxane antifouling coating film which are laminated in order on a surface of a base, said epoxy anticorrosive coating composition comprising:

(A) an epoxy resin,
(B) a curing agent for epoxy resins, and
(C) a modifier which is either (i) a modifier comprising a hydroxyl group-containing petroleum resin (c1) or a hydroxyl group-containing terpenephenol resin (c2) or (ii) a modifier comprising a hydroxyl group-containing petroleum resin (c1) or a hydroxyl group-containing terpenephenol resin (c2) and a coumarone resin (c3).

It is preferable that the modifier (C) is the modifier (ii) comprising a hydroxyl group-containing petroleum resin (c1) or a hydroxyl group-containing terpenephenol resin (c2) and a coumarone resin (c3) and contains the coumarone resin (c3) 1 in an amount of 1 to 99 parts by weight in the total 100 parts by weight of the resin (c1) or the resin (c2) and the resin (c3).

It is also preferable that the modifier (C) is contained in an amount of 5 to 200 parts by weight based on 100 parts by weight of the cured resin solid component.

The hydroxyl group-containing petroleum resin (c1) or the hydroxyl group-containing terpenephenol resin (c2) preferably has 1 to 3 hydroxyl groups in one molecule.

The softening point of the hydroxyl group-containing petroleum resin (c1) or the hydroxyl group-containing terpenephenol resin (c2) is preferably in the range of 40 to 160° C.

The softening point of the coumarone resin (c3) is preferably in the range of 90 to 120° C.

The epoxy anticorrosive coating composition preferably further comprises at least one component selected from the group consisting of talc, silica and titanium oxide, and also preferably further comprises an anti-sagging agent.

The anticorrosive coating film of the present invention is formed from the above-described epoxy anticorrosive coating composition.

The organopolysilixane antifouling composite coating film of the present invention is an organopolysiloxane antifouling composite coating film comprising the above-mentioned anticorrosive coating film (I) and an organopolysiloxane antifouling coating film (II) which are laminated in order on a surface of a base, wherein the organopolysiloxane antifouling coating film (II) is an antifouling coating film formed from a moisture-curing organopolysiloxane composition comprising oragnopolysiloxane having condensing functional groups at both ends of a molecule.

The organopolysiloxane antifouling coating film (II) is preferably a coating film formed from a moisture-curing organopolysiloxane composition comprising organopolysiloxane having condensing functional groups at both ends of a molecule and liquid paraffin or a silicone oil.

The organopolysiloxane antifouling coating film (II) is preferably a coating film formed from a moisture-curing organopolysiloxane composition containing the liquid paraffin or the silicone oil in an amount of 1 to 150 parts by weight based on 100 parts by weight of the organopolysiloxane having condensing functional groups at both ends of a molecule.

The ship or the underwater structure with a composite coating film of the present invention is coated with the above-mentioned organopolysiloxane antifouling composite coating film.

Effect of the Invention

According to the epoxy anticorrosive coating composition of the present invention, an anticorrosive coating film having excellent adhesion to an organopolysiloxane antifouling coating film and exhibiting excellent anticorrosion property for a base can be formed. By the use of the epoxy anticorrosive coating composition the working term can be made shorter than before and the painting cost can be decreased because an intermediate coating film (binder layer) is unnecessary.

BEST MODE FOR CARRYING OUT THE INVENTION

The epoxy anticorrosive coating composition of the invention is an anticorrosive coating composition for an organopolysilixane antifouling coating film and is used for forming an epoxy anti-corrosive coating film in an antifouling composite coating film comprising an epoxy anticorrosive coating film and an organopolysiloxane antifouling coating film which are laminated in order on a surface of a base.

The epoxy anticorrosive coating composition comprises:
(A) an epoxy resin,
(B) a curing agent for epoxy resins, and
(C) a modifier which is either (i) a modifier comprising a hydroxyl group-containing petroleum resin (c1) or a hydroxyl group-containing terpenephenol resin (c2), or (ii) a modifier comprising a hydroxyl group-containing petroleum resin (c1) or a hydroxyl group-containing terpenephenol resin (c2) and a coumarone resin (c3).

The components are described below.
Epoxy Resin (A)

The epoxy resin (A) is a resin having two or more epoxy groups in one molecule, and the epoxy equivalent is desired to be in the range of 160 to 700, preferably 180 to 500. Examples of such epoxy resins include glycidyl ether epoxy resins, glycidyl ester epoxy resins, glycidyl amine epoxy resins, phenol novolak epoxy resins, cresol epoxy resins, dimer acid modified epoxy resins, aliphatic epoxy resins and alicyclic epoxy resins. Of these, bisphenol epoxy resins, particularly bisphenol A type epoxy resins, that are glycidyl ether epoxy resins are preferably used. When the bisphenol epoxy resin is used, a coating film having excellent adhesion to an organopolysiloxane antifouling coating film can be formed.

Examples of the epoxy resins of bisphenol A type include bisphenol A type diglycidyl ethers, such as bisphenol A diglycidyl ether, bisphenol A polypropylene oxide diglycidyl ether, bisphenol A ethylene oxide diglycidyl ether, hydrogenated bisphenol A diglycidyl ether and hydrogenated bisphenol A propylene oxide diglycidyl ether.

Examples of typical bisphenol epoxy resins include resins which are liquid at ordinary temperature, such as "Epicoat 828" (trade name, available from Shell Co., Ltd., epoxy equivalent: 180 to 190), "Epotohto YDF-170" (trade name, available from Tohto Kasei Co., Ltd, epoxy equivalent: 160 to 180) and "Flep 60" (trade name, available from Toray Thiokol Co., Ltd., epoxy equivalent: about 280); resins which are semi-solid at ordinary temperature, such as "Epicoat 834" (trade name, available from Shell Co., Ltd., epoxy equivalent: 230 to 270) and "Epotohto YD-134" (trade name, available from Tohto Kasei Co., Ltd., epoxy equivalent: 230 to 270); and resins which are solid at ordinary temperature, such as "Epicoat 1001" (trade name, available from Shell Co., Ltd., epoxy equivalent: 450 to 500). These epoxy resins can be used singly or in combination of two or more kinds.

Curing Agent (B) for Epoxy Resins

The curing agent (B) for epoxy resins is used for curing the above epoxy resin, and an amine curing agent which can react with the above epoxy resin to cure the resin is preferably used. Examples of such amine curing agents include hitherto known curing agents for epoxy resins, such as modified polyamine curing agents, polyamide curing agents and modified polyamide curing agents.

Examples of the modified polyamine curing agents include modification products of polyamines such as aliphatic polyamines, alicyclic polyamines, aromatic polyamines, specifically, metaxylenediamine, isophoronediamine, diethylenetriamine, triethylenetetramine and diaminodiphenylmethane. More specifically, there can be mentioned, for example, aliphatic, alicyclic or aromatic polyamines wherein polyamines have been modified by epoxide addition, Michael addition, Mannich addition, thiourea addition, acrylonitrile addition and ketone capping.

These modified polyamines, polyamides and modification products of polyamides desirably have an amine value of usually 50 to 1000 preferably 80 to 500. When the amine value of the curing agent is in this range, a balance between drying property and adhesion tends to be improved. These curing agents are usually liquid to solid. The polyamide curing agents are, for example, polyamides obtained by the reaction of dimer acid with amines. Examples of the amines include the aforesaid aliphatic polyamines alicyclic polyamines and aromatic polyamines. More specifically, there can be mentioned, for example, "Lackamide N-153" (trade name, available from Dainippon Ink & Chemicals Inc., amine value: 80 to 120), "Lackamide TD-966" (trade name, available from Dainippon Ink & Chemicals Inc., amine value: 150 to 190) and "Sanamide 315" trade name, available from Sanwa Chemical Industry Co., Ltd., amine value 280 to 340).

The modified polyamide curing agents include modification products of the polyamides, and specifically, there can be mentioned, for example, "PA-23" (trade name, available from Ohtake Chemical Co. Ltd., amine value 80 to 150, that is an epoxy adduct obtained by the addition reaction of polyamide with an epoxy compound, and "Adeca Hardener EH-350" (trade name, available from Asahi Electro-Chemical Co., Ltd., amine value: 320 to 380) that is a Mannich modification product of modified polyamide.

Of the above polyamides and modification products thereof, an adduct of an epoxy compound is preferably used. The above-mentioned modified polyamines, polyamides and modification products of polyamides can be used singly or in combination of two or more kinds.

Modifier (C)

As the modifier (C), the hydroxyl group-containing petroleum resin (c1) or the hydroxyl group-containing terpenephenol resin (c2) (modifier (i)) may be used singly, or a combination of the resin (c1) or the resin (c2) and the coumarone resin (c3) may be used.

Hydroxyl Group-Containing Petroleum Resin (c1)

The hydroxyl group-containing petroleum resin (c1) is a polymer using, as a main raw material a fraction that is a by-product in the petroleum refining and containing a hydroxyl group. In the present invention, the resin (c1) is desirably a hydroxyl group-containing petroleum resin that is solid at ordinary temperature and has a softening point of 40 to 160° C., preferably 50 to 150° C. If the softening point of the hydroxyl group-containing petroleum resin is lower than 40° C., water resistance and seawater resistance of the coating film are lowered, and the hydroxyl group-containing petroleum resin sometimes bleeds out on the film surface to cause remaining of tackiness. On the other hand, if the softening point exceeds 160° C., the paint viscosity becomes high to lower workability or to lower film properties so that such a softening temperature is undesirable.

The hydroxyl group-containing petroleum resin (c1) desirably has 1 to 3 hydroxyl groups, preferably 1 to 2 hydroxyl groups, in one molecule. In case of a hydroxyl group-containing petroleum resin having less than 1 hydroxyl group in one molecules compatibility of the epoxy resin (A) with the curing agent (B) for epoxy resins is lowered, and hence, evil influence is exerted on the film properties. If the number of hydroxyl groups in one molecule exceeds 3, water resistance and seawater resistance of the coating film are lowered, so that such a number is undesirable.

Examples of the hydroxyl group-containing petroleum resins (c1) include aromatic petroleum resins obtained by polymerizing $C_9$ fractions from heavy oils produced as by-products in petroleum naphtha cracking, such as styrene derivatives, indene and vinyltoluene, aliphatic petroleum resins obtained by polymerizing $C_5$ fractions such as 1,3-pentadiene and isoprene copolymerization petroleum resins obtained by copolymerizing the $C_9$ fractions and the $C_5$ fractions, aliphatic petroleum resins obtained by partially cyclic-polymerizing conjugated dienes of $C_5$ fractions, such as cyclopentadiene and 1,3-pentadiene, resins obtained by hydrogenating the aromatic petroleum resins, and alicyclic petroleum resins obtained by polymerizing dicyclopentadiene. Into these petroleum resins, a hydroxyl group is introduced. Of these, hydroxyl group-containing aromatic petroleum resins are particularly preferable from the viewpoints of water resistance and seawater resistance.

The above hydroxyl group-containing petroleum resins (c1) can be used singly or in combination of two or more kinds.

Hydroxyl Group-Containing Terpenephenol Resin (c2)

The hydroxyl group-containing terpenephenol resin (c2) is a copolymer of a terpene monomer and a phenol compound and is represented by the formula $(C_{10}H_{16})_n(C_6H_6O)_m$ (m is an integer of 2 or greater, and n is a multiple of ½). Examples of constituent units which are derived from terpene and constitute the hydroxyl group-containing terpenephenol resin (sometimes referred to as "terpene constituent units" hereinafter) include constituent units derived from non-cyclic terpenes or cyclic terpeness such as monoterpene $((C_{10}H_{16}))$, sesguiterpene $((C_{15}H_{24}))$, diterpene $((C_{20}H_{32}))$ and triterpene $((C_{30}H_{48}))$, and constituent units derived from their derivatives. Examples of constituent units which are derived from the phenol compound and constitute the hydroxyl group-containing terpenephenol resin (sometimes referred to as "phenol compound constituent units" hereinafter) include constituent units derived from phenols cresol and bisphenol A.

The terpene constituent units may constitute the hydroxyl group-containing terpenephenol resin singly or in combination of two or more kinds, and the phenol compound constituent units may constitute the hydroxyl group-containing terpenephenol resin singly or in combination of two or more kinds. Further, the terpene constituent units and the phenol compound constituent units may be present alternately or at random to constitute the hydroxyl group-containing terpenephenol resin.

The hydroxyl group-containing terpenephenol resin (c2) desirably has 1 to 3 hydroxyl groups preferably 1 to 2 hydroxyl groups, in one molecule. In case of a terpenephenol resin having less than 1 hydroxyl group in one molecule, compatibility of the epoxy resin (A) with the curing agent (B) for epoxy resins is sometimes deteriorated. If the number of hydroxyl groups in one molecule exceeds 3, water resistance and seawater resistance of the coating film are lowered, so that such a number is undesirable.

The hydroxyl group-containing terpenephenol resin (c2) desirably has a number-average molecular weight (Mn), as measured by GPC, of about 300 to 600, preferably 300 to 500. Further, the hydroxyl group-containing terpenephenol resin (c2) desirably has a softening point of 40 to 160° C., preferably 60 to 140° C. If the softening point is lower than 40° C., properties such as anticorrosion are deteriorated. If the softening point exceeds 160° C., the resin viscosity is increased to sometimes deteriorate workability.

As the hydroxyl group-containing terepenephenol resin (c2) a resin obtained by copolymerizing the terpene monomer and the phenol compound in an organic solvent in the presence of a Friedel-Crafts catalyst or the like can be used, or a commercially available resin can be also used. The hydroxyl group-containing terpenephenol resins (c2) can be used singly or in combination of two or more kinds.

Coumarone Resin (c3)

The coumarone resin (c3) is a copolymer containing such coumarone component unit, indene component unit and styrene component unit as represented by the following formulas [I] in the main chain.

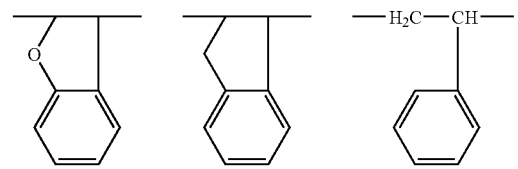

[I]

The coumarone resin (c3) may be a coumarone resin whose end is modified with phenol, or may be a coumarone resin wherein at least a part of aromatic rings are hydrogenated. Examples of such coumarone resins include a liquid product having a number-average molecular weight of 200 to 300 and a solid product having a number-average molecular weight of 600 to 800. The coumarone resins (c3 can be used singly or in combination of two or more kinds.

Of the coumarone resins (c3) for use in the invention, the liquid product desirably has a viscosity (25° C.) of usually 5 to 20 poise, and the solid product desirably has a softening point of usually 90 to 120° C. Of such coumarone resins, the solid product is preferably used in the invention.

As the modifier (C) for use in the invention, the modifier (i) which is the hydroxyl group-containing petroleum resin (c1) or the hydroxyl group-containing terpenephenol resin (c2), or the modifier (ii) which comprises the hydroxyl group-containing petroleum resin (c1) or the hydroxyl group-containing terpenephenol resin (c2) and the coumarone resin (c3) can be used, as described above.

When the modifier (C) is the modifier (i) which is the hydroxyl group-containing petroleum resin (c1) or the hydroxyl group-containing terpenephenol resin (c2), the modifier (C) is desirably contained in an amount of preferably 5 to 200 parts by weights more preferably 10 to 100 parts by weight, particularly preferably 20 to 50 parts by weight, based on 100 parts by weight of the cured resin solid component (cured product of the epoxy resin (A) and the curing agent (B) for epoxy resins, the same shall apply hereinafter) If the amount of the modifier (C) is less than 5 parts by weight, satisfactory anticorrosion property cannot be obtained, and adhesion to a silicone antifouling coating film is also lowered. If the amount thereof exceeds 200 parts by weight, the coating film strength tends to become insufficient.

When the modifier (C) is the modifier (ii) which comprises the hydroxyl group-containing petroleum resin (c1) or the hydroxyl group-containing terpenephenol resin (c2) and the coumarone resin (c3), the coumarone resin (c3) is desirably contained in an amount of preferably 1 to 99 parts by weight, more preferably 30 to 70 parts by weight, in the total 100 parts by weight of the modifier (C). Further, the modifier (C) is desirably used in an amount of preferably 5 to 200 parts by weight, more preferably 10 to 100 parts by weight, particularly preferably 20 to 50 parts by weight, based on 100 parts by weight of the cured resin solid component. When the amount of the modifier is in the above range, more excellent anticorrosion property is obtained, and adhesion to a silicone antifouling coating is further improved.

The anticorrosive coating film (I) formed from the epoxy anticorrosive coating composition of the invention contains such a modifier (C), and hence, the film is excellent not only in adhesion to an antifouling coating film formed thereon but also in anticorrosion property. Moreover, by the use of the later-described antifouling coating film (II) comprising "organopolysiloxane having condensing functional groups at both ends of a molecule" as an antifouling coating film, the anticorrosive coating film (I) is particularly excellent in the above effects.

Epoxy Anticorrosive Coating Composition and Epoxy Anticorrosive Coating Film

The epoxy anticorrosive coating composition of the invention is obtained by mixing the above components by a conventional process. More specifically to the epoxy resin (A), the modifier (C) is added, preferably at least one component selected from the group consisting of talc, silica and titanium oxide is further added, more preferably an anti-sagging agent is also added, and if necessary, other components are further added, and they are mixed and stirred by a stirring machine to homogeneously disperse them, whereby a main agent component is prepared. To the main agent component, a curing agent component containing the curing agent (B) for epoxy resins is added, and they are mixed and stirred to disperse them, whereby the epoxy anticorrosive coating composition is prepared Examples of other components contained in the main agent component include inorganic dehydrating agent (stabilizer), coloring pigment, dye, other film-forming components, solvent (e.g., xylene, methyl isobutyl ketone) germicide, antifungal agent, anti-aging agent, antioxidant, antistatic agent, flame retardant, thermal conduction improver and adhesion imparting agent.

The curing agent component and the main agent component are used in such amounts that the equivalent ratio of the active hydrogen equivalent of the curing agent (B) for epoxy resins to the epoxy equivalent of the epoxy resin (active hydrogen equivalent/epoxy equivalent) is preferably 0.4 to 1.0 more preferably 0.5 to 0.9. When the equivalent ratio is in this range, an epoxy anticorrosive coating film having excellent curability and excellent anticorrosion property can be formed.

The epoxy anticorrosive coating film of the invention is formed on a surface of a base (object of coating) by a hitherto known process using the epoxy anticorrosive coating composition.

As the bases, there can be mentioned, for example, underwater or water-surface structures, such as cooling water supply/drainage channels of thermal or atomic power plants or other seaside plants and port facilities, and various molded products, such as ships. Of these objects of coating (bases) on which the antifouling coating films are formed, preferable in the invention are underwater or water-surface structures, and more preferable are cooling water supply/drainage channels (both of in-take channels and drainage channels) of power plants.

Prior to application of the epoxy anticorrosive coating composition onto the base surface, "a base surface treatment" is preferably carried out in advance in the following manner. In case of plastics or rubbers, it is desirable that surface roughening of the base surface is carried out by the use of an abrasive such as a sand paper and then stains on the base surface are wiped off using a cloth saturated with an organic solvent such as a lacquer thinner to clean the base surface. In case of concrete materials, it is desirable that efflorescence or laitance adhering to the base surface is removed carefully by a disc sander, a power brush or the like, then washing with fresh water is carried out to clean the base surfaces and adsorbed water is removed by air drying or hot air dying so that the water content of the surface should become not more than 10% by weight. In case of carbon steel materials, it is desirable that mill scale, rust and the like are removed by a disc sander, a power brush or the like and then contaminants adhering to the base surface are removed using a cloth saturated with an organic solvent. In case of materials of aluminum, stainless steel, copper alloy and the like, light surface roughing of the base surface is carried out using a power brush, a sand paper or the like and then stains on the base surface are wiped off using a cloth saturated with an organic solvent to clean the base surface. After such base surface adjustment, a metal base surface may be subjected to rust prevention painting for purposes of temporary rust prevention. For the rust prevention painting, a primary rust-preventing primer (shop primer) such as an inorganic zinc rich primer is used.

The base surface having been subjected to the base surface treatment when needed is coated with the epoxy anticorrosive coating composition of the invention by a coating method, such as spraying (air spraying, airless spraying) coating with a roll coater, coating with a flow coater, brushing or immersion, and the coating layer is dried to form an anticorrosive coating film. The coating weight of the epoxy anticorrosive coating composition varies depending upon the type of an object of coating, the type or combination of the later-described organopolysiloxane antifouling coating film, etc. and cannot be determined indiscriminately. As the drying method, hot air drying, IR drying, ordinary temperature air drying or the like can be adopted according to the type of a silicone resin in a silicone resin antifouling coating used and the film-forming temperature (drying curing temperature).

Organopolysiloxane Anti-Fouling Composite Coating Film

The oragnopolysiloxane antifouling composite coating film of the invention is an anti-fouling composite coating film in which the aforesaid epoxy anticorrosive coating film (I) and an organopolysiloxane antifouling coating film (II) are laminated in order on a base surface.

The organopolysiloxane antifouling coating film (II) is not specifically restricted, but preferable is an antifouling coating film formed from a moisture-curing organopolysiloxane composition comprising organopolysiloxane having condensing functional groups at both ends of a molecule. The anticorrosive coating film (I) of the invention contains the modifier (C) in the specific amount as previously described, and therefore, the coating film (I) has excellent adhesion to the organopolysiloxane antifouling coating film (II) formed on a surface of the coating film (I) and has excellent anticorrosion property. Moreover, by the use of the antifouling coating film (II) comprising "organopolysiloxane having condensing functional groups at both ends of a molecules" as the antifouling film, the anticorrosive coating film (I) is particularly excellent in the above effects.

Moisture-Curing Organopolysiloxane Composition

The moisture-curing organopolysiloxane composition for use in the invention comprises organopolysiloxane having condensing functional groups at both ends of a molecule (also referred to as "organopolysiloxane" simply hereinafter) and preferably further contains liquid paraffin or a silicone oil Organopolysiloxane The organopolysiloxane is the same as organopolysiloxane described in Japanese Patent Laid-Open Publication No. 181509/2001 and has condensation reactive groups at both ends of a molecule (chain molecule or molecular main chain).

Such organopolysiloxane is desirably one represented by the following formula (II):

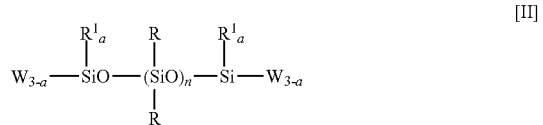

[II]

wherein W is a hydroxyl group (—OH) or a hydrolyzable group, $R^1$ and R are each independently an unsubstituted or substituted monovalent hydrocarbon group of 1 to 12 carbon atoms, plural $R^1$ and plural R may be each the same or different, n is an integer of 5 or greater, and a is 0, 1 or 2).

When a in the formula [II] is 0 or 1, W is desirably a hydrolyzable group, and when a is 2 W is desirably a hydroxyl group (—OH).

In the case where W in the formula [II] is a hydrolyzable group, examples of such hydrolyzable groups include an alkoxy group, an acyloxy group, an alkenyloxy group, an imonoxy group, an amino group, an amide group and an aminoxy group, and preferable are an iminoxy group (ketoxime group) and an alkoxy group.

The alkoxy group is desirably an alkoxy group having 1 to 10 carbon atoms in all, and between the carbon atoms, an oxygen atom may be present at one or more positions. Examples of such alkoxy groups include methoxy, ethoxy, propoxy, butoxy, methoxyethoxy and ethoxyethoxy. The acyloxy group is desirably an aliphatic or aromatic acyloxy group represented by the formula RCOO— (wherein R is an alkyl group of 1 to 10 carbon atoms or an aromatic group of 6 to 12 carbon atoms), and examples of such acyloxy groups include acetoxy, propionoxy, butyloxy and benzoyloxy.

The alkenyloxy group is desirably an alkenyloxy group of about 3 to 10 carbon atoms, and examples of such alkenyloxy groups include isopropenyloxy, isobutenyloxy and 1-ethyl-2-methylvinyloxy.

The iminoxy group (R'R"=C=N—O—, also referred to as "oximino group" or "ketoxime group") is desirably an iminoxy group of about 3 to 10 carbon atoms and examples of such iminoxy groups include ketoxime, dimethylketoxime, methyethylketoxime, diethylketoxime, cyclopentanoxime and cyclohexanoxime.

The amino group is desirably an amino group of 1 to 10 carbon atoms, and examples of such amino groups include N-methylamino, N-ethylamino, N-propylamino, N-butylamino, N,N-dimethylamino, N,N-diethylamino and cyclohexylamino. The amide group is preferably an amide group having 2 to 10 carbon atoms in all, and examples of such amide groups include N-methylacetamide, N-ethylacetamide and N-methylbenzamide.

The aminoxy group is desirably an aminoxy group having 2 to 10 carbon atoms in all, and examples of such aminoxy groups include N,N-dimethylaminoxy and N,N-diethylaminoxy. $R^1$ and R are each independently an unsubstituted or substituted monovalent hydrocarbon group of 1 to 12 carbon atoms, more preferably 1 to 10 carbon atoms, particularly preferably 1 to 8 carbon atoms. Examples of such monovalent hydrocarbon groups include an alkyl group, an alkenyl group, an aryl group a cycloalkyl group and an aralkyl group.

The alkyl group may be any of straight-chain, branched and alicyclic alkyl groups, and is preferably a straight-chain or branched alkyl group of 1 to 10 carbon atoms, preferably 1 to 8 carbon atoms, or a cycloalkyl group of 3 to 6 carbon atoms. Examples of such straight-chain or branched alkyl groups include methyl, ethyl, propyl, butyl, 2-ethylbutyl and octyl. Particularly preferable is methyl. Examples of the alicyclic alkyl groups include cyclohexyl and cyclopentyl.

The alkenyl group is desirably an alkenyl group of 2 to 10 carbon atoms, preferably about 2 to 8 carbon atoms, and examples of such alkenyl groups include vinyl, hexenyl and allyl. The aryl group is desirably an aryl group of 6 to 15 carbon atoms, preferably about 6 to 12 carbon atoms, and examples of such aryl groups include phenyl, tolyl, xylyl, naphthyl and diphenyl. Particularly preferable is phenyl.

The cycloalkyl group is desirably a cycloalkyl group or 3 to 8 carbon atoms and is for example, cyclohexyl. The aralkyl group is desirably an aralkyl group having 7 to 10 carbon atoms in all, preferably about 7 to 8 carbon atoms in all, and examples of such aralkyl groups include benzyl and 2-phenylethyl. A part or all of hydrogen atoms bonded to carbon atoms in these groups $R^1$ may be replaced with halogen atoms such as F, Cl, Br and I, a cyano group, etc. Examples of the halogenated alkyl groups include chloromethyl, 3,3,3-trifluoropropyl and 2-cyanoethyl.

Of the above groups, preferable as R in the formula [II] is an unsubstituted monovalent hydrocarbon group, and particularly preferable is methyl or phenyl. When plural R 1 or plural R are present in the organopolysiloxane represented by the formula [II], the plural $R^1$, the plural R, or $R^1$ and R may be the same or different.

The viscosity of the organopolysiloxane at 25° C. is in the range of usually 25 cS to 1,500,000 cS, preferably 25 to 500,000 cS, more preferably 500 to 200,000 cS, particularly preferably 1,000 to 100,000 cS, taking into account paintability of the resulting composition, prevention of sagging in diluting of the resulting composition with a solvent, etc.

From the viewpoint of improvement in painting efficiency or the like, such organopolysiloxane, particularly a silicone rubber of deoximation curing type, is desirably contained in an amount of usually 20 to 90% by weight, preferably 40 to 80% by weight, in the moisture-curing organopolysiloxane composition, and is desirably contained in an amount of 30 to 90% by weight, preferably 40 to 70% by weight, when the total amount of the solid components is 100% by weight.

Liquid Paraffin

The liquid paraffin which is sometimes used in the invention becomes a bleeding component, and is a liquid hydrocarbon oil mainly composed of alkylnaphthenes and obtained by distilling a crude oil to collect fractions of spindle oil to engine oil except gasoline, kerosene, gas oil and the like and then refining the collected fractions. The liquid paraffin is preferably liquid paraffin that is in conformity with the prescription of JIS K 9003. The liquid paraffin bleeds on the coating film surface in the early stage and contributes to initial antifouling performance.

Silicone Oil

As the silicone oil which is sometimes used in the invention, such a silicone oil as described in Japanese Patent Laid-Open Publication No. 181509/2001 previously proposed by the present applicant is used.

The silicone oil is not specifically restricted provided that it is an unreactive (non-condensing) silicone oil (e.g., silicone oil [1] represented by the following formula [1], silicone oil [3] represented by the following formula [3] or a silicone oil that bleeds out from the cured product of the moisture-curing organopolysiloxane composition e.g., silicone oil having a group represented by the following formula [2]), and preferable is an unreactive silicone oil represented by the following formula [1] or [3].

Such a silicone oil [1] or [3] exhibits neither reactivity to the organopolysiloxane that becomes a film-forming component nor self-condensation property and is considered to have a function of forming an antifouling functional layer (film) on the coating film surface. Further, it is considered that the silicone oil [2] reacts with the organopolysiloxane to form a cured coating film, then the film is hydrolyzed with time when it is immersed in seawater for a long period of time, and the end group becomes a group having an alcoholic hydroxyl group ($\equiv$Si—$R^4$—OH) or the like and gradually bleeds out on the composite coating film surface to exert an effect of preventing adhesion of marine organisms $$(R^2)_3SiO(SiR^3{}_2O)_nSi(R^2)_3 \quad [1]$$

In the formula [1], plural $R^2$ may be the same or different and are each an alkyl group of 1 to 10 carbon atoms, an aryl group, an aralkyl group or a fluoroalkyl group, plural $R^3$ may the same or different and are each an alkyl group of 1 to 10 carbon atoms, an aryl group an aralkyl group or a fluoroalkyl group and n is a number of 0 to 50.

[2]

In the formula [2], $R^4$ is an unsubstituted or substituted divalent hydrocarbon group or a divalent hydrocarbon group containing an ether linkage, $R^5$ is an unsubstituted or substituted monovalent hydrocarbon group, Y is a hydrolyzable group, and b is 0, 1 or 2.

[3]

In the formula [3], $R^6$ is a hydrogen atom or an alkyl, aryl or aralkyl group of 1 to 10 carbon atoms, $R^7$ is a divalent aliphatic hydrocarbon group of 1 to 10 carbon atoms in which an ether group, an ester group or —NH— may be present, Z is an amino group, a carboxyl group, an epoxy group or a monovalent polar group that is a polyethylene glycol or polypropylene glycol group whose end may be capped with an alkyl group of 1 to 6 carbon atoms or an acyl group, and x and y are numbers satisfying the conditions of $0.01 \leq x \leq 3.99$, $0.02 \leq y \leq 4$ and $0.02 \leq x+y < 4$.

Of the above silicone oils, such a silicon oil as described in Japanese Patent Laid-Open Publication No. 316933/1998 is employable as the silicone oil [1], and desirable is a silicone oil having a number-average molecular weight of 180 to 20,000, preferably 1,000 to 10,000, and having a viscosity of 20 to 30,000 centistokes, preferably 50 to 3,000 centistokes.

Such a silicone oil [1] is, for example, a dimethyl silicone oil wherein all of $R^2$ and $R^3$ are methyl groups, or a methylphenyl silicone oil wherein a part of methyl groups in the dimethyl silicone oil are replaced with phenyl groups. Of these, preferable is a methylphenyl silicone oil. More specifically, there can be mentioned "KF-96" (available from Shin-Etsu Silicone Co., Ltd.), "TSF 4300" (available from Toshiba Silicone Co., Ltd.), etc.

As the silicone oil having a group represented by the formula [2] (silicone oil [2]), a silicone oil proposed by the present applicant and described in Japanese Patent No 2522854 is employable, and desirable is a silicone oil having a number-average molecular weight of 250 to 20,000, preferably 1,000 to 10,000, and having a viscosity of 20 to 30,000 centistokes, preferably 50 to 3,000 centistokes.

$R^4$ in the formula [2] is an unsubstituted or substituted divalent hydrocarbon group, such as methylene, ethylene, propylene, butylene or hexamethylene, a divalent hydrocarbon group containing an ether linkage, which is represented by the formula $—(CH_2)_p—O—(CH_2)_q—$ (wherein p and q are each independently an integer of 1 to 6), or the like.

$R^5$ is an unsubstituted or substituted monovalent hydrocarbon group of 1 to 8 carbon atoms. Y is the same group as the hydrolyzable group W in the formula [II]. Examples of the silicone oils [2] having at least one group represented by the formula [2] include those wherein hydroxyl groups of silicone oils are capped with hydrolyzable groups, which are described in the aforesaid Japanese Patent No. 2522854 and represented by the formulas $(CH_3)_3SiO[(CH_3)_2SiO]_m[R^7R^8SiO]_n(CH_3)_2SiC_3H_6—OH$, $HO—C_3H_6—[(CH_3)_2SiO][(CH_3)_2SiO]_m[R^7R^8SiO]_n—(CH_3)_2Si—C_3H_6—OH$, and $(CH_3)_3SiO[(CH_3)_2SiO]_m[R^7R^8SiO]_n[(CH_3)(C_3H_6—OH)SiO]_1[(CH_3)_2SiCH_3]$. In the above formulas, $R^7$ and $R^8$ are each an aryl group, such as phenyl or tolyl, an aralkyl group, such as benzyl or β-phenylethyl, a halogenated alkyl group, such as trifluoropropyl, or the like, at least one of $R^7$ and $R^8$ is an unsubstituted or substituted hydrocarbon group selected from groups other than a methyl group, and m, n, and 1 are each a positive number.

From the viewpoint of storage stability of the resulting composition, a silicone oil obtained by allowing the above silicon oil to react with organosilane represented by the formula $R^5{}_bSiY_{3-b}$ ($R^5$, Y and b are the same as those in the formula [2]) is also employable. Examples of such silicone oils include $(CH_3)_3SiO[(CH_3)_2SiO]_m[R^7R^8SiO]_n(CH_3)_2SiC_3H_6—O—R^5{}_bSiY_{3-b}$, $HO—C_3H_6—[(CH_3)_2SiO]$

[(CH$_3$)$_2$SiO]$_m$[R$^7$R$^8$SiO]$_n$—(CH$_3$)$_2$Si—C$_3$H$_6$—O—R$^5{}_b$SiY$_{3-b}$, and (CH$_3$)$_3$SiO[(CH$_3$)$_2$SiO]$_m$[R$^7$R$^8$SiO]$_n$[(CH$_3$)(C$_3$H$_6$—O—R$^5{}_b$SiY$_{3-b}$)SiO]$_1$[(CH$_3$)$_2$SiCH$_3$].

As the silicone oil [3] such a silicon oil as described in Japanese Patent Laid-Open Publication No. 316933/1998 is employable, and desirable is a silicone oil having a number-average molecular weight of 250 to 30,000, preferably 1,000 to 20,000, and having a viscosity of 20 to 30,000 centistokes, preferably 50 to 3,000 centistokes.

The silicone oil [3] is desirably a silicone oil of the formula [3] wherein R$^6$ is methyl or phenyl and R$^7$ is methylene, ethylene or propylene. When Z is a polyethylene glycol or polypropylene glycol group whose end may be capped with an alkyl group of 6 or less carbon atoms or an acyl group, the number of oxyethylene or oxypropylene units as recurring units is preferably in the range of 10 to 60. Examples of the alkyl groups for end capping include methyl, ethyl, propyl and butyl. Examples of the acyl groups for end capping include ketoxime, acetyl and propionyl.

Specific examples of the silicone oils wherein the polar group Z is an amino group include "SF8417" (available from Dow Corning Toray Silicone Co., Ltd.), "ISIS4700" and "ISI4701" (available from Toshiba Silicone Co., Ltd.), and "FZ3712" and "AFL-40" (available from Nippon Unicar Co., Ltd.). Specific examples of the silicone oils wherein the polar group Z is a carboxyl group include "XI42-411" (available from Toshiba Silicone Co., Ltd.), "SF8418" (available from Dow Corning Toray Silicone Co., Ltd.), and "FXZ4707" (available from Nippon Unicar Co., Ltd.) Specific examples of the silicone oils wherein the polar group Z is an epoxy group include "SF8411" (available from Dow Corning Toray Silicone Co., Ltd.), "XI42-301" (available from Toshiba Silicone Co., Ltd.), and "L-93" and "T-29" (available from Nippon Unicar Co., Ltd. Specific examples of the silicone oils wherein the polar group Z is an alkyl group or an acyl group include "ISI 4460", "ISI4445" and "ISI4446" (available from Toshiba Silicone Co., Ltd.), "SH3746", "SH8400", "SH3749" and "SH3700" (available from Dow Corning Toray Silicone Co., Ltd.), and "KF6009" (available from Shin-Etsu Silicone Co., Ltd.).

As the silicone oil, any one of the silicone oil [1], the silicone oil [2] and the silicone oil [3], or a combination of two or more of them is used in the invention.

In the moisture-curing organopolysiloxane composition comprising the above components, the liquid paraffin or the silicone oil is desirably contained in an amount of 1 to 150 parts by weight, preferably 20 to 100 parts by weight, more preferably 20 to 60 parts by weight, based on 100 parts by weight of the organopolysiloxane. When the amount of the silicone oil is in the above range, an antifouling coating film that is excellent in both of antifouling performance and film strength is obtained. If the amount thereof is less than the lower limit of the above range, the antifouling performance is sometimes lowered. If the amount thereof exceeds the upper limit of the above range, the film strength is sometimes lowered.

To the organopolysiloxane composition, an organic solvent to improve painting workability, a pigment, and other various additives, such as a pigment dispersant, an anti-sagging agent and an anti-foaming agent, can be added when needed, in addition to the above components.

The antifouling coating composition is prepared by mixing and dispersing the above components together or separately by a usual paint preparation apparatus, such as a ball mill or a dispersing machine. The thus prepared antifouling coating composition is applied as it is or after subjected to viscosity control using a solvent so as to improve painting workability, onto a surface of the epoxy anticorrosive coating film (I) by means of airless spraying, air spraying, roller coating, brushing or the like, and then the composition layer is dried to form an organopolysiloxane antifouling coating film (II).

In the organopolysiloxane antifouling composite coating film formed as above, the epoxy anticorrosive coating film (I) and the organopolysiloxane antifouling coating film (II) are laminated in order on the base surface, and it is desirable that the thickness of the epoxy anticorrosive coating film (I) is adjusted to 50 to 300 μm, preferably 100 to 300 μm, more preferably 150 to 250 μm, and the thickness of the organopolysiloxane antifouling coating film (II) is adjusted to 50 to 300 μm, preferably 50 to 200 μm, more preferably 50 to 150 μm. By adjusting the thickness of the anticorrosive coating film (I) and the antifouling coating film (II) to the above range, the antifouling composite coating film has excellent strength and excellent adhesion to the base surface and exhibits excellent anticorrosion property and antifouling performance over a long period of time.

The organopolysiloxane antifouling composite film formed as above is useful as an antifouling composite film formed on surfaces of bases of ships and underwater structures, e.g., structures placed in seawater, such as cooling water supply/drainage channels of thermal or atomic power plants and other seaside plants, port facilities, undersea pipelines, excavation rigs for submarine oil field, navigation buoys and ship mooring buoys, and structures placed in fresh water.

EXAMPLES

The present invention is further described with reference to the following examples, but it should be construed that the invention is in no way limited to those examples. The terms "part(s)" and "%" used hereinafter mean "part's) by weight" and "% by weight", respectively Materials used in the following examples are shown below.

Materials Used

Epoxy resin A (trade name: Epicoat 1001, epoxy equivalent: 475, available from Shell Co., Ltd.)

Epoxy resin B (trade name: Epicoat 834, epoxy equivalent: 250, available from Shell Co., Ltd.)

Epoxy resin C (trade name: Epicoat 828, epoxy equivalent: 190, available from Shell Co., Ltd.)

Hydroxyl group-containing terpenephenol resin A (trade name YP-90L, number-average molecular weight 440, mixture of resins each having 1 to 3 hydroxyl groups in one molecule, available from Yasuhara Chemical Co., Ltd.

Hydroxyl group-containing terpenephenol resin B (trade name YP-90, resin having 2 hydroxyl groups in one molecule, available from Yasuhara Chemical Co., Ltd.)

Hydroxyl group-containing petroleum resin (trade name: Neopolymer E-100, number-average molecular weight: 450, divinyltoluene/indene copolymer having one hydroxyl group in one molecule, available from Nippon Petrochemicals Co. Ltd.)

Coumarone resin (trade name. ESCURON V-120, number-average molecular weight: 730, available from Nippon Steel Chemical Co., Ltd.

Anti-sagging agent (trade name: Disperon 6650, fatty acid amide wax, available from Kusumoto Chemicals, Ltd.)

Curing agent for epoxy resins (trade name: Lackamide TD-966, polyamide, active hydrogen equivalent 377 available from Dainippon Ink & Chemicals Inc.)

Oraganoploysiloxane Antifouling Coating SI-1

Blend of KE-445 trade name, silicone resin, viscosity: 5 Pa·s, available from Shin-Etsu Chemical Co Ltd.) and KF-96-

100cs (trade name silicone oil, viscosity: 100 centistokes, available from Shin-Etsu Chemical Co., Ltd.) in a solids content weight ratio of 100:30

Organopolysiloxane Antifouling Coating SI-2

Blend of TSE388 (trade name, silicone resin, viscosity: 10 Pa·s, available from Toshiba Silicone Co., Ltd.) and TSF4300 (trade name, silicone oil, viscosity: 140 centistokes, available from Toshiba Silicone Co., Ltd.) in a solids content weight ratio of 100:30

Example 1

In a 1-liter polyethylene container, 100 parts of the epoxy resin A, 30 parts of the hydroxyl group-containing terpenephenol resin A, 50 parts of titanium whites 100 parts of talc 60 parts of silica 5 parts of an anti-sagging agent, 20 parts of xylene and 10 parts of methyl isobutyl ketone (MIBK) were placed, and they were mixed and stirred by a stirring machine to homogeneously disperse them, whereby a main agent was prepared. To the main agent, 60 parts of polyamide were added as a curing agent, and they were mixed and stirred to disperse them, whereby an epoxy anticorrosive coating composition which was an undercoating composition was obtained.

Subsequently, the epoxy anticorrosive coating composition was applied onto a sandblasted steel plate (150×70×3.2 mm) by airless spraying so that the film thickness (dry film thickness) should become about 200 μm and then dried for 7 days in an atmosphere of 20° C. and 65% RH. Onto the surface of the resulting epoxy anticorrosive coating film, the organopolysiloxane antifouling coating SI-1 was further applied as a finish coating so that the dry film thickness should become 100 μm, to obtain a coated plate having an antifouling coating film. This coated plate was dried at room temperature (20° C.) for 7 days to form an organopolysilocane antifouling composite coating film.

Examples 2 to 9, Comparative Examples 1 to 5

Organopolysiloxane antifouling composite coating films of Examples 2 to 9 and Comparative Examples 1 to 3 were obtained in the same manner as in Example 1, except that the composition and the amounts of the blending components were changed as shown in Table 1.

As Comparative Example 4, an epoxy resin coating (trade name: Epicon HB-AL, available from Chugoku Marine Paints Ltd.) was used, and as Comparative Example 5, an epoxy resin binder (trade name: Epicon HB-AL binder, available from Chugoku Marine Paints, Ltd.) was used.

Test Methods

The coated plates each having an antifouling composite coating film, which had been obtained in Examples 1 to 9 and Comparative Examples 1 to 5, were set on an immersion raft and immersed in the sea at a depth of 1 m. After 6 months and 12 months, anticorrosion property and adhesion were evaluated based on the following evaluation criteria. The evaluation results are as shown in Table 2.

Anticorrosion Property

After immersion for 6 months and 12 months, occurrence of blister on the coating film surface of the test plate was examined by visual observation.

| | |
|---|---|
| AA: | pass |
| BB: | blistered |

Adhesion

After immersion for 6 months and 12 months, on the surface of the test plate, a cut in the form of a cross was made with a knife, then the edge of a blade of the cutter was inserted at the cut portion, and occurrence of peeling was examined by visual observation to evaluate adhesion between the anticorrosive coating film and the silicone antifouling coating film.

| | |
|---|---|
| AA: | good |
| BB: | slightly bad |
| CC: | bad |

TABLE 1

| | | Example | | | | | | | | | Comparative Example | | | | |
|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 |
| Undercoating composition (parts(s) by weight) | Epoxy resin A | 100 | | 60 | 60 | 60 | 100 | 60 | 60 | 60 | 100 | 60 | 60 | Epoxy resin coating | Epoxy resin binder |
| | Epoxy resin B | | | 40 | 40 | 40 | | 40 | 40 | | | 40 | 40 | | |
| | Epoxy resin c | | 100 | | | | | | | 40 | | | | | |
| | Hydroxyl group-containing terpenephenol resin A | 30 | 30 | 15 | 30 | | | | | | | | | | |
| | Hydroxyl group-containing terpenephenol resin B | | | | | 15 | | | | | | | | | |
| | Hydroxyl group-containing petroleum resin | | | | | | 45 | 30 | 20 | 15 | | | | | |
| | Coumarone resin | | | 30 | 15 | 30 | | 15 | 25 | 30 | 45 | 45 | | | |
| | Titanium white | 50 | 50 | 50 | 50 | 50 | 50 | 50 | 50 | 50 | 50 | 50 | 50 | | |
| | Talc | 100 | 100 | 100 | 100 | 100 | 100 | 100 | 100 | 100 | 100 | 100 | 100 | | |
| | Silica | 60 | 60 | 60 | 60 | 60 | 60 | 60 | 60 | 60 | 60 | 60 | 60 | | |
| | Anti-sagging agent | 5 | 5 | 5 | 5 | 5 | 5 | 5 | 5 | 5 | 5 | 5 | 5 | | |
| | Xylene | 20 | 20 | 20 | 20 | 20 | 20 | 20 | 20 | 20 | 20 | 20 | 20 | | |
| | Methyl isobutyl ketone (MIBK) | 10 | 10 | 10 | 10 | 10 | 10 | 10 | 10 | 10 | 10 | 10 | 10 | | |
| | Curing agent | 60 | 60 | 60 | 60 | 60 | 60 | 60 | 60 | 60 | 60 | 60 | 60 | | |

TABLE 1-continued

|  |  | Example |  |  |  |  |  |  |  |  | Comparative Example |  |  |  |  |
|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 |
| Finish coating | Organopolysiloxane antifouling coating | SI-1 | SI-1 | SI-1 | SI-2 | SI-2 | SI-2 | SI-1 | SI-2 | SI-2 | SI-1 | SI-2 | SI-2 | SI-1 | SI-2 |

TABLE 2

|  |  | Example |  |  |  |  |  |  |  |  | Comparative Example |  |  |  |  |
|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 |
| After 6 months | Anticorrosion property | AA | AA | AA | AA | AA | AA | AA | AA | AA | AA | CC | CC | CC | AA |
|  | Adhesion after immersion | AA | AA | AA | AA | AA | AA | AA | AA | AA | BB | CC | CC | CC | AA |
| After 12 months | Anticorrosion property | AA | AA | AA | AA | AA | AA | AA | AA | AA | AA | CC | CC | CC | AA |
|  | Adhesion after immersion | AA | AA | AA | AA | AA | AA | AA | AA | AA | BB | CC | CC | CC | AA |

The invention claimed is:

1. An organopolysiloxane antifouling composite coating film comprising:
   (I) an anticorrosive coating film; and
   (II) an organopolysiloxane antifouling coating film,
   wherein the anticorrosive coating film (I) and the organopolysiloxane antifouling coating film (II) are laminated in order on a surface of a base,
   wherein the anticorrosive coating film (I) is formed from an epoxy anticorrosive coating composition comprising:
   (A) an epoxy resin;
   (B) a curing agent for epoxy resins; and
   (C) a modifier, which is either
      (i) a modifier comprising a hydroxyl group-containing petroleum resin (c1), or
      (ii) a modifier comprising a hydroxyl group-containing petroleum resin (c1) and a coumarone resin (c3), and
   wherein the organopolysiloxane antifouling coating film (II) is formed from a moisture-curing organopolysiloxane composition comprising an organopolysiloxane represented by the following formula (II) having a condensing functional group at both ends of a molecule:

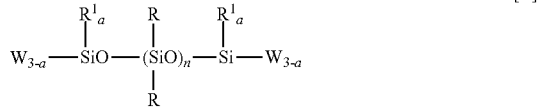

[II]

wherein W is a hydroxyl group or a hydrolyzable group, $R^1$ and R are each independently represented by a substituted or unsubstituted monovalent hydrocarbon group having 1 to 12 carbon atoms, with the proviso that a plural of $R^1$ and a plural of R may be the same or different, n is an integer of 5 or greater, and a is 0, 1 or 2, and
wherein the hydroxyl group-containing petroleum resin (c1) has 1 to 2 hydroxyl groups in one molecule.

2. The organopolysiloxane antifouling composite coating film according to claim 1, wherein the moisture-curing organopolysiloxane composition further comprises a liquid paraffin or a silicone oil.

3. The organopolysiloxane antifouling composite coating film according to claim 2, wherein the liquid paraffin or the silicone oil is contained in an amount of 1 to 150 parts by weight based on 100 parts by weight of the organopolysiloxane having a condensing functional group at both ends of a molecule.

4. A ship or an underwater structure coated with the organopolysiloxane antifouling composite coating film according to claim 1.

5. The organopolysiloxane antifouling composite coating film according to claim 1, wherein the modifier (C) is the modifier (ii) comprising a hydroxyl group-containing petroleum resin (c1) and a coumarone resin (c3), wherein the coumarone resin (c3) is present in an amount of 1 to 99 parts by weight based on a total 100 parts by weight of the hydroxyl group-containing petroleum resin (c1) and the coumarone resin (c3).

6. The organopolysiloxane antifouling composite coating film according to claim 1, wherein the modifier (C) is present in an amount of 5 to 200 parts by weight based on 100 parts by weight of the cured resin solid component.

7. The organopolysiloxane antifouling composite coating film according to claim 1, wherein the hydroxyl group-containing petroleum resin (c1) has 1 hydroxyl group in one molecule.

8. The organopolysiloxane antifouling composite coating film according to claim 1, wherein the hydroxyl group-containing petroleum resin (c1) has a softening point of from 40° C. to 160° C.

9. The organopolysiloxane antifouling composite coating film according to claim 1, wherein the modifier (C) is the modifier (ii) comprising a hydroxyl group-containing petroleum resin (c1) and a coumarone resin (c3), wherein the coumarone resin (c3) has a softening point of from 90° C. to 120° C.

10. The organopolysiloxane antifouling composite coating film according to claim 1, wherein the epoxy anticorrosive coating composition further comprises at least one component selected from the group consisting of talc, silica and titanium oxide.

11. The organopolysiloxane antifouling composite coating film according to claim 1, wherein the epoxy anticorrosive coating composition further comprises an anti-sagging agent.

12. The organopolysiloxane antifouling composite coating film according to claim 1, wherein the hydroxyl group-containing petroleum resin (c1) has 2 hydroxyl groups in one molecule.

* * * * *